P. LETALLE.
Running-Gear for Vehicles.
No. 204,343. Patented May 28, 1878.
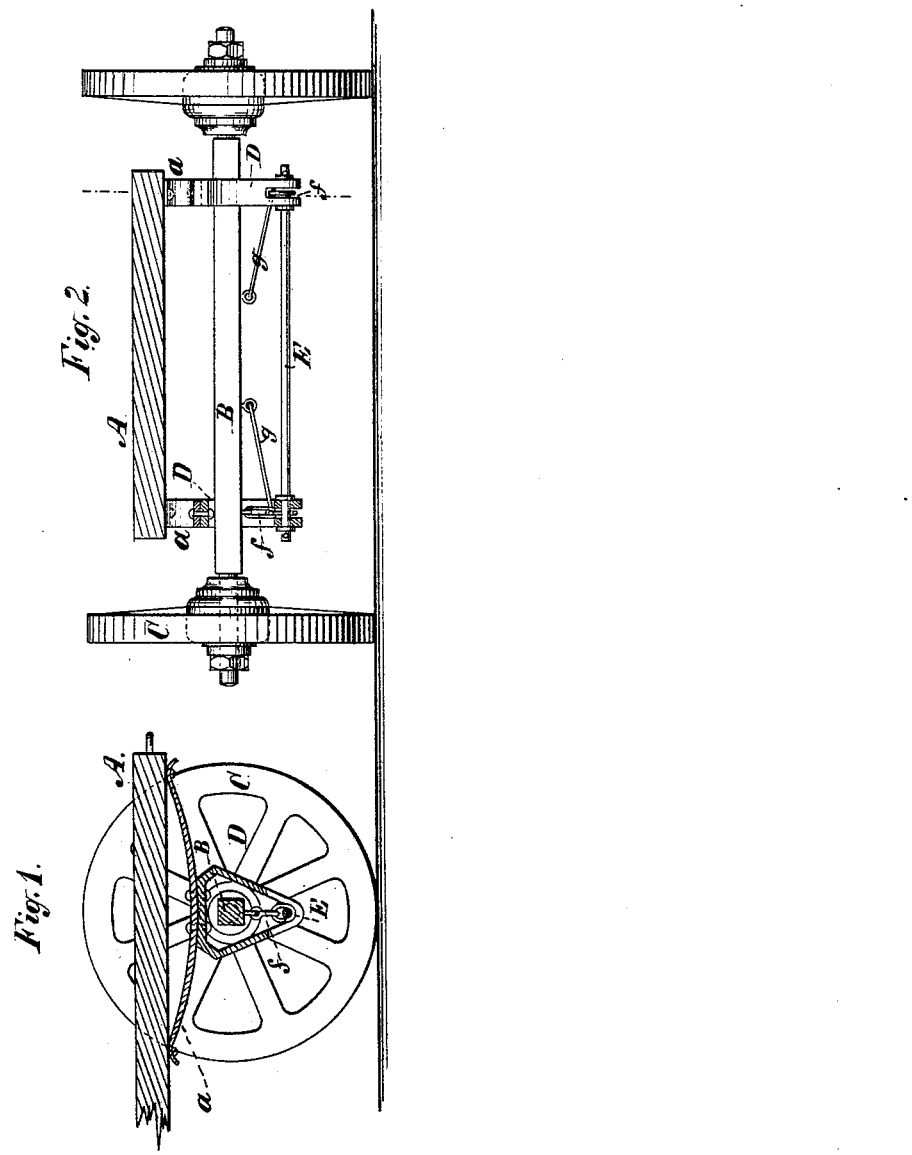

UNITED STATES PATENT OFFICE.

PAUL LETALLE, OF PARIS, FRANCE.

IMPROVEMENT IN RUNNING-GEARS FOR VEHICLES.

Specification forming part of Letters Patent No. 204,343, dated May 28, 1878; application filed March 6, 1878.

*To all whom it may concern:*

Be it known that I, PAUL LETALLE, of Paris, in the Republic of France, have invented certain Improvements in Vehicles; and I do hereby declare that the following is a full, clear, and exact description of the same, sufficient to enable those skilled in the art to which my invention appertains to make and use the same.

The object of my invention is to accomplish a reduction of the draft and of shocks, and consequently of the wear and tear, of vehicles, by withdrawing the load from the direct action of the ground in cases where irregularity and unevenness in the surface occur.

To this end the invention consists in a novel mode of suspending the load below the center of the wheels by means of intermediate flexible links, so as to allow the free oscillation of the load backward and forward, and also in a lateral direction, without affecting the position of the axle.

The accompanying drawing illustrates the manner of carrying out my invention. In Sheet 1, Figure 1 is a vertical section longitudinally of the vehicle and transversely of the axle. Fig. 2 is a vertical section transversely of the vehicle and parallel with the axle.

A represents a portion of the body of the vehicle, B the axle, and C the wheels. D is a yoke or frame attached to the under side of the body A, or to a spring, $a$, attached to said body, there being two of said yokes or frames for each axle, one on each side of the vehicle. E is a rod or bar lying parallel with the axle B, and having its ends secured in the lower portions of the yokes or frames D. At each end of the rod or bar E, within the frame D, are links or chains $f$, connecting said rod or bar E with the axle B. By this means the load is suspended below the center of the wheels. Braces $g\ g$, which may be chains or rods, are arranged underneath and parallel with the axle B, and connect the same with the rod or bar E, or with the chains or links $f$, the upper ends of the rods being attached to staples or eyes in the axle, and the lower ends being connected with the links $f$.

By this construction and arrangement of parts the load is suspended below the center of the wheels in such a manner as to allow it to oscillate both backward and forward, and also in a lateral direction, without causing the axle to turn or move longitudinally, so that the running-gear is relieved from strain by the swaying of the load, so that when one or both of the wheels strike an obstruction in the road the shock is greatly reduced, as the wheel is only momentarily arrested, while the point of suspension continues its travel, and the force of the obstruction is rendered less abrupt.

The backward and forward motion of the load is limited by the shape of the yoke D, as shown in Fig. 1, and the lateral or transverse motion is limited by the rods $g\ g$, as shown in Fig. 2.

If preferred, chains may be substituted for the rods $g\ g$.

This system of suspension may be applied to railway-cars, gun-carriages, and vehicles of various descriptions.

What I claim as new, and desire to secure by Letters Patent, is—

The combination, in a vehicle, of the body A, yokes D, axles B, and flexible connection $f$, substantially as and for the purpose set forth.

P. LETALLE.

Witnesses:
   HENRY T. BROWN,
   VERNON H. HARRIS.